United States Patent
Waas et al.

(10) Patent No.: US 6,222,717 B1
(45) Date of Patent: *Apr. 24, 2001

(54) MULTI-CHAMBER TELECOMMUNICATIONS TERMINAL BLOCK WITH LINKING MODULE

(75) Inventors: Charles W. Waas; Joseph D. Lorenzen, both of Burbank, CA (US)

(73) Assignee: 3M Innovative Properties Co., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/856,935

(22) Filed: May 15, 1997

Related U.S. Application Data (62) Continuation-in-part of application No. 08/817,249, filed as application No. PCT/US95/12745 on Sep. 29, 1995, and application No. 08/817,750, filed as application No. PCT/US94/11908 on Oct. 21, 1994, now Pat. No. 5,836,791.

(51) Int. Cl.⁷ ...................................................... H02H 9/06
(52) U.S. Cl. ................................................ 361/119; 439/412
(58) Field of Search ........................................ 361/111, 112, 361/117, 118, 119, 126, 127, 728, 823, 824; 174/51, 52.1, 52.2; 439/95, 97, 108, 389, 391, 409–413, 572, 709, 915

(56) References Cited

U.S. PATENT DOCUMENTS

| | | | |
|---|---|---|---|
| 4,288,832 | 9/1981 | Saligny | 361/119 |
| 4,420,792 | 12/1983 | Hegner et al. | 361/331 |
| 4,424,546 | 1/1984 | Smith | 361/119 |
| 4,876,621 | 10/1989 | Rust et al. | 361/58 |
| 4,924,345 | 5/1990 | Siemon et al. | 361/111 |
| 5,069,637 | 12/1991 | Baubles | 439/412 |
| 5,149,278 | 9/1992 | Waas et al. | 439/412 |
| 5,175,662 | 12/1992 | DeBalko et al. | 361/119 |
| 5,224,013 | 6/1993 | Pagliuca | 361/119 |
| 5,260,994 | 11/1993 | Suffi | 379/399 |
| 5,296,646 | 3/1994 | Capper et al. | 361/119 |
| 5,365,660 | 11/1994 | Capper et al. | 361/119 |
| 5,435,747 | * 7/1995 | Franckx et al. | 439/409 |

FOREIGN PATENT DOCUMENTS

| | | | |
|---|---|---|---|
| 0 711 012 A1 | 5/1996 | (EP) | H01T/4/06 |
| 2 129 630 | 5/1984 | (GB) | H01R/4/24 |

* cited by examiner

Primary Examiner—Ronald W. Leja
(74) Attorney, Agent, or Firm—John A. Fortkort (57) ABSTRACT

A terminal block for terminating one or more exchange wires to one or more service wires has a housing including a plurality of separate chambers each of which are accessible to a service wire through a wire access port. The terminal block includes an access jack including a service wire junction contact provided within a service wire junction contact slot, an exchange wire junction contact provided within an exchange wire junction contact slot and an earth junction contact retained within an earth junction contact slot. Exchange wires are terminated to respective exchange wire junction contacts in the terminal block and the corresponding stub cable is permanently secured thereto. One or more service wires are terminated and conductively connected to a service wire junction contact. A linking module is provided which, when inserted into the access jack, forms a conductive connection between the service wire junction contact and the exchange wire junction contact. The linking module further includes a protection device which provides protection to the service side and exchange side. The linking module may be removed and replaced as needed. Removing the linking module from the access jack severs the conductive connection between the service wire junction contact and the exchange wire junction contact.

25 Claims, 9 Drawing Sheets

MULTI-CHAMBER TELECOMMUNICATIONS TERMINAL BLOCK WITH LINKING MODULE

REFERENCE TO RELATED APPLICATIONS

The present application is a continuation in part of Ser. No. 08/817,249 filed in the U.S. on Apr. 18, 1997, entitled MULTI-WIRE TERMINAL BLOCK EMPLOYING REMOVABLE SURGE PROTECTOR," which was filed under 35 U.S.C. §371 based on International Application No. PCT/US95/12745 filed in the PCT on Sep. 29, 1995; and a continuation in part Ser. No. 08/817,750 filed in the U.S. on Apr. 18, 1997, now U.S. Pat. No. 5,836,791 and entitled MODULAR TELECOMMUNICATIONS TERMINAL BLOCK," which was filed under 35 U.S.C. §371 based on International Application No. PCT/US94/11908 filed in the PCT on Oct. 21, 1994. These applications are incorporated herein by this reference.

BACKGROUND

1. Field of the Invention

The present invention relates to telecommunications terminal blocks such as terminal blocks for connecting telephone service wires to telephone exchange distribution cables. More particularly, the present invention relates to providing electrical surge protection for telecommunications terminal blocks.

2. Description of Related Art

Telecommunications terminal blocks are used to provide convenient electrical connections between telephone customer service wires, or drop wires, (the "service" side) and telephone exchange distribution cables (the "exchange" side). Such terminal blocks typically connect up to 50 distribution cable wire pairs on the exchange side, which may have several thousand wire pairs, to up to 50 corresponding service wire pairs on the service side. Terminal blocks generally are configured as standard, multi-wire units which terminate either 3, 5, 10, 12, 15, 25 or 50 wire pairs.

The exchange side of the terminal block is connected to the exchange wires of the distribution cable through a stub cable. One end of the stub cable is typically permanently connected to the exchange side of the terminal block within the terminal block. The other end of the stub cable is connected to the distribution cable. The permanent connection between the stub cable and the exchange side of the terminal block may be potted or provided within a chamber which seals the exchange side from the environment and provides a physically robust connection to withstand the recurring installing and removing of connections on the service side.

The service side of a terminal block is used to removably connect service wires to the distribution cable, through the terminal block, so as to allow later disconnection and reconnection. Service wire pairs are typically connected to the terminal block through some type of terminal which is easy to connect and disconnect on-site such as a simple binding post where a stripped service wire is connected to the binding post and then secured with some type of cap. Another common type of terminal is an insulation displacement terminal where the service wire need not be bared prior to the connection to the terminal block and the insulation is severed through a blade or other sharp surface as the service wire is secured to the terminal. Again, in the insulation displacement type of terminal, some type of cap is typically employed to secure the service wire in place.

While the caps typically employed in the binding post or insulation displacement type terminals provide some protection from the environment, nonetheless, moisture, pollutants, chemicals, dust and even insects may reach the terminal connection resulting in corrosion or other degradation of the contact. This problem is exacerbated by the fact that in addition to the traditional aerial location of such terminal blocks, underground and even underwater terminal block locations are more and more frequently required for telephone distribution applications. Accordingly, efforts have been made to better insulate the terminal in the terminal block from the environment to prevent such degradation. One such approach has been to use a variety of insulating mediums, such as greases or gels to surround the terminal where the electrical connection is made.

Protecting telecommunications equipment against current and voltage surges is also very important. Conventionally, the protection systems have been designed to resist major surges, e.g. due to lightning strikes or accidental connection to high voltage sources. Typically, such protection provided for telecommunications lines is comparatively large and unwieldy, and therefore provided as a stand-alone package which is installed in concert with the lines to be protected. Due to their size, many of these systems are limited to protecting individual lines in areas without space restrictions such as telephone central offices or corporate offices which have adequate room to house individual protection for each line. Protection systems in this environment typically use gas tubes and, more recently, solid state devices to provide protection.

Increasingly, telecommunications terminal blocks connect service applications having sensitive electronic equipment, such as computers, directly to the telecommunication lines. As a result, protection against surges smaller than lightning strikes is needed. Such smaller surges may occur virtually anywhere along a system and hence more individualized protection for each line is needed.

Terminal blocks are available which provide protection in addition to terminating service wires to exchange wires. A prior art telecommunications terminal block, of the binding post variety, which provides protection by providing a substantially larger terminal block which includes separate protection circuits. Each binding post which is used for service wire connections is connected to a corresponding screw-in type protector secured within a threaded protection retainer adapted to receive the screw-in protector. A protector may be added as needed to provide protection to a particular line or to permit replacement of a protector.

The prior art terminal block, as described above, is larger than a typical terminal block because it must provide the required room for the protection circuits. Moreover, as a binding post type terminal block, limited protection is provided against the environment. Due to the substantial space required and the limited protection against the environment, this prior art protected terminal block may be inadequate for installations where exposure to the environment can be expected or where terminal block space is limited.

Another issue which is raised in providing protection is minimizing cost. This issue in turn is related to how often line protection is needed. In some applications every line connected to a particular terminal block may need to be protected. Protecting each line can be costly, however, due to the components involved in providing protection. For example, a separate gas discharge tube or semiconductor device may typically be needed for each line. Therefore, in some cases a particular user may decide that certain lines do not require protection or are not worth the cost of protection in view of the probability that a voltage surge may occur. As a result, it is desirable that a terminal block be provided in which the user has the option to determine which lines may need protection and add protection to those lines. Also, lines may be changed from active to inactive status or may change type of use. Therefore, it is desirable to permit the flexibility to either add or remove the protection, as the use of the lines involved changes.

Another important issue in termination of exchange and service wires is the ability to test the connections easily, whether for repair or preventative maintenance. In order to properly test connections and determine if a problem is related to the exchange side or the service side it is necessary to disconnect one side so that either side may be evaluated independently. Generally, the service side is disconnected because it may not be possible to disconnect the exchange side wires. In this case, additional time is spent disconnecting the service side wires, stripping the wires, and connecting the wires to test equipment to assess the problem. Once the problem is solved, the test assembly must be removed and the service side wires connected to the terminal block. This process requires significant time.

Accordingly, a need presently exists for an improved telecommunications terminal block having protection against electrical surges. Further, a need exists for an improved telecommunications terminal block which permits testing of the service or exchange sides without disconnecting service or exchange side wires, while maintaining resistance to moisture and other environmental factors which subject the connections within the terminal block to degradation over time and limit the applications where such terminal blocks may be reliably employed. Further, a need presently exists for a terminal block which provides the above features in a cost effective manner and which provides flexibility of use.

SUMMARY OF THE INVENTION

The present invention is directed to an apparatus that satisfies the above noted needs.

In accordance with a preferred embodiment, the present invention provides a terminal block for terminating one or more exchange wires from a stub cable to one or more service wires. The terminal block includes an exchange side connection, e.g. to a stub cable, which may preferably be potted or otherwise affixed inside a housing which is preferably formed of a dielectric material. The terminal block includes a plurality of access jacks, each having a service wire junction contact provided within a service wire junction contact slot and an exchange wire junction contact provided within an exchange wire junction contact slot. The terminal block includes a plurality of means for terminating the service wires within the housing, each of which provides an electrically conductive connection from a service wire to the service wire junction contact. Each exchange wire from the stub cable is permanently secured to a respective exchange wire junction contact within the terminal block housing. The terminal block includes a variable number of removable linking modules which are inserted into selected ones of the access jacks which correspond to active service side connections. The linking module provides a conductive connection between the service wire junction contact and the exchange wire junction contact retained in the access jack.

The linking module may be provided in a variety of embodiments. In one embodiment the linking module includes a cover having an open and a closed position and a conductive contact secured in the cover; a service wire test contact; and an exchange wire test contact. When the linking module is installed in the access jack the service wire test contact is in conductive communication with the service wire junction contact and the exchange wire test contact is in conductive communication with the exchange wire junction contact. The conductive contact in the cover provides a conductive connection between the service wire test contact and the exchange wire test contact when the cover is closed, thus conductively connecting the service side to the exchange side. Removing the linking module from the access jack severs the conductive connection between the service wire junction contact and the exchange wire junction contact.

In an alternate embodiment the linking module may be embodied as a bridge module having an integrally formed bridge contact including a service wire junction contact and an exchange wire junction contact. When the bridge module is plugged into the access jack the service side is connected to the exchange side via the bridge contact.

In an alternate embodiment of the bridge module, the bridge module may be provided with an integrally formed test contact extending through a test contact opening in the bridge module for providing signal test access to the signal carried by the bridge contact therein.

In another embodiment of the bridge module, in a terminal block in which the access jack includes an earth junction contact maintained at ground potential, the bridge module embodiment of the linking module is equipped with a protection device conductively connected to the bridge contact and a protector earth contact conductively connected to the earth junction contact to provide protection to the circuit conductively connected by the bridge contact.

In yet another embodiment of the bridge module, the bridge module may include both a test port and test contact in addition to the protection device and the protector earth contact.

In a preferred embodiment, the means for terminating a service wire within the housing each includes a termination mechanism including a wire carrier member configured in a corresponding chamber in the housing. Each wire carrier member has an opening for receiving the service wire inserted through the access port in the housing. In addition, the means for terminating a service wire includes an actuator mechanism that is coupled to the wire carrier member and adapted to move the wire carrier member within the housing and relative to the actuator mechanism in a manner such that the actuator mechanism does not change its degree of entry into the housing. The chambers are adapted to receive an electrically insulating medium and the wire carrier member is provided with means for allowing the electrically insulating medium to flow around the wire carrier member during actuation such that a substantially constant volume of the fluid insulating medium is maintained within the chamber.

In a further embodiment, when the cover is opened the conductive connection is severed and a service wire test contact and an exchange wire test contact are exposed such that the service signal and the exchange signal may be independently tested.

In another embodiment the access jack retains a junction contact within an earth junction contact slot and the linking module includes a protection device having a first conductive connection to one of either the service wire test contact or the exchange wire test contact and a second conductive connection to the earth junction contact. The terminal block includes means for grounding the earth junction contact to earth. The means for grounding includes a ground strip conductively connected to the earth junction contact, and a stub cable adapter including a ground post conductively connected to the ground strip. A sheath connector conductively connects the ground post and the conductive sheath provided with the stub cable. When the ground post is connected to earth the stub cable and the earth junction contact are conductively connected to earth.

The protection device includes devices such as a gas discharge tube protector, a hybrid solid state and gas discharge tube protector, and a solid state protector.

The service wires may be removed and reconnected through the service side openings and the service wire carrier numerous times.

In a further embodiment of the terminal block for terminating exchange wires to service wires, an exchange wire terminating means is provided for terminating an exchange wire from a stub cable secured within the housing. The exchange wire terminating means provides a permanent electrically conductive connection from an exchange wire to an exchange wire junction contact. Means for linking the service wire junction contact and the exchange wire junction contact is provided to form a conductive connection therebetween, wherein the linking means is removable and wherein removing the linking means severs the conductive connection.

In an alternate embodiment the linking means includes means integrally formed with the housing for providing conductive access to the service wire junction contact and the exchange wire junction contact within the terminal block housing; and a replaceable linking module removably inserted into the access means, wherein the linking module provides a conductive connection between the service wire junction contact and the exchange wire junction contact.

Therefore, when the linking module is plugged into the access jack, the service side is connected to the exchange side. Preferably each access jack connects a pair of service wires to a pair of exchange wires. When a protection device is included in the linking module the exchange and service sides are protected by the protection device. The protection device shunts voltage to earth in the event there are voltage spikes on the conductive path between the service side and the exchange side, for example. Further, because a protected linking module is easily replaced, when a protected linking module fails it can easily be replaced while retaining the corresponding service wire and exchange wire terminations.

A reliable, easy to manufacture structure is a further feature of the terminal block of the present invention.

Accordingly, it will be appreciated that the present invention provides an improved telecommunications terminal block having significantly improved and replaceable electrical protection while retaining its resistance to environmental factors such as moisture, chemicals and other such contaminants and retaining a relatively simple construction.

A more complete understanding of the improved terminal block of the present invention will be afforded to those of ordinary skill in the art, as well as a realization of additional advantages and objects thereof, by a consideration of the following detailed description of the preferred embodiment. Reference will be made to the appended sheets of drawings which will first be described briefly.

DETAILED DESCRIPTION

A detailed description of the present invention will now be presented in conjunction with the embodiments of the present invention illustrated in FIGS. 1–11, wherein like reference numbers refer to like elements. While several embodiments are illustrated in FIGS. 1–11, it is to be understood that the present invention is in no way limited to the embodiments shown in the drawings.

Figure 1:
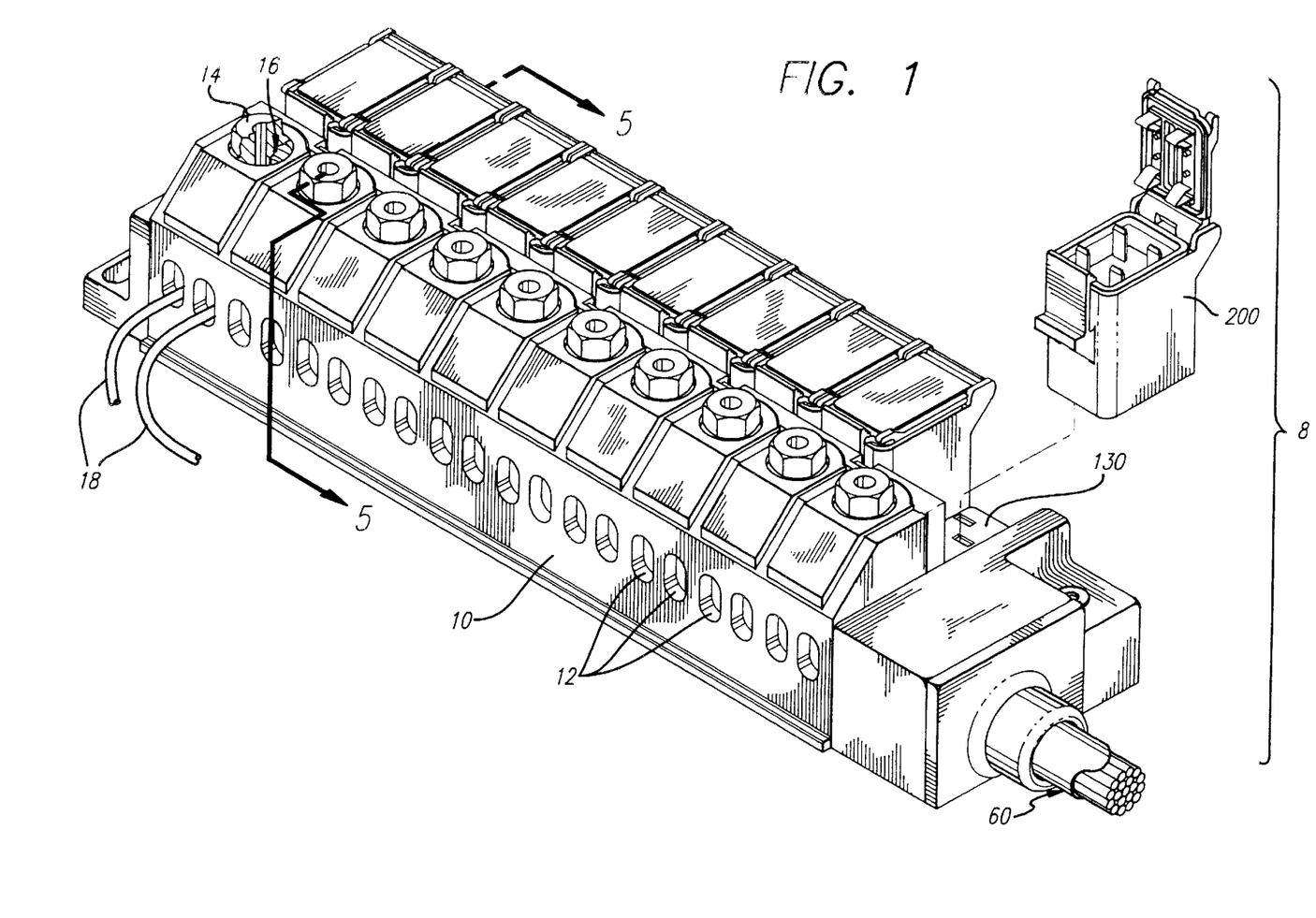
FIG. 1 is a first perspective view of a preferred embodiment of the terminal block of the present invention showing a detached linking module.
Figure 2:
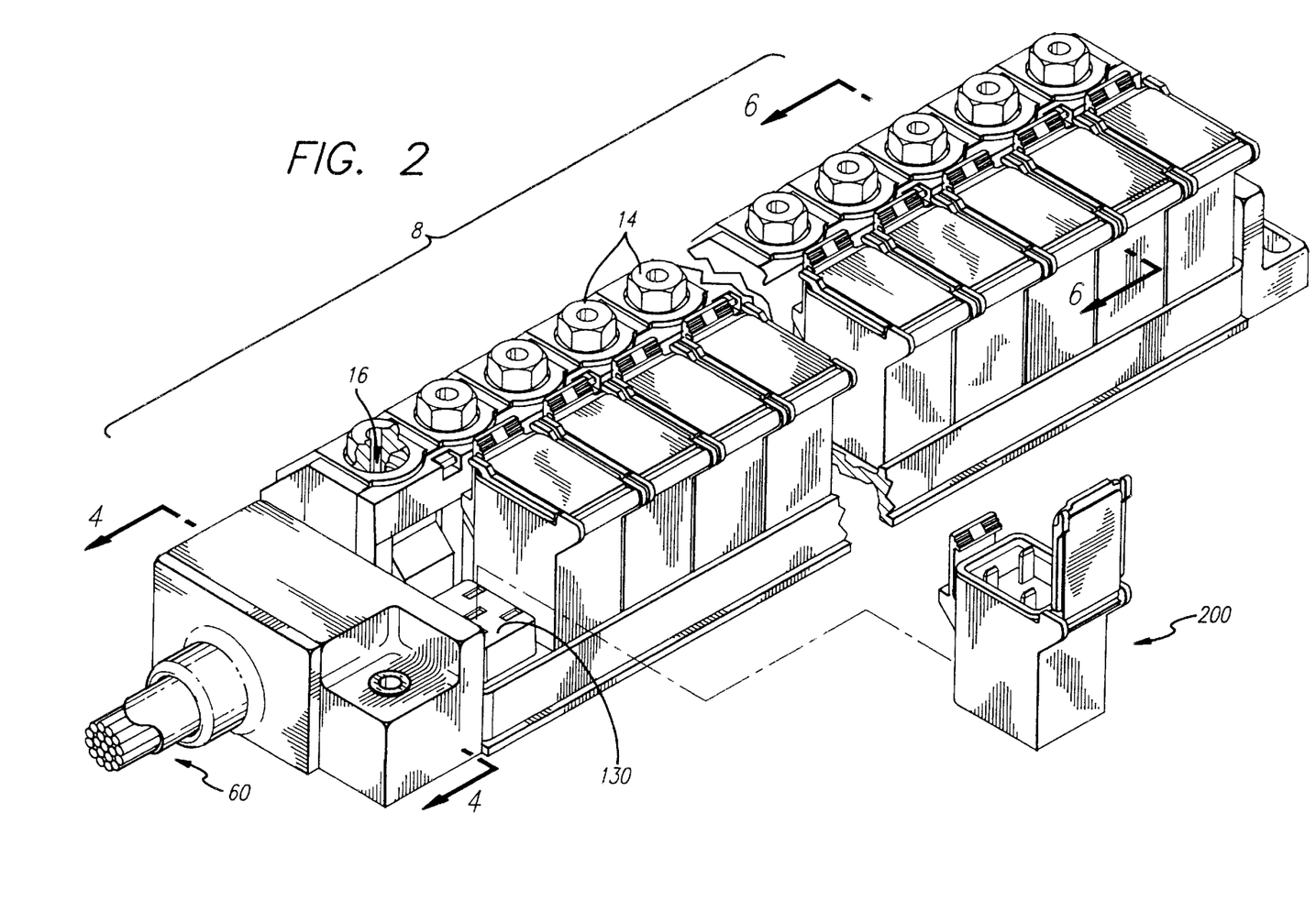
FIG. 2 is a second perspective view of a preferred embodiment of the terminal block of the present invention showing a detached linking module.

A telecommunications terminal block in accordance with a preferred embodiment of the present invention is shown in FIGS. 1 and 2. Referring to FIG. 1 a first perspective view of a telecommunications terminal block 8 is illustrated which uses a linking module 200 which may be inserted into an access jack 130 to connect the service side to the exchange side. As will be discussed in more detail below, the linking module 200, when inserted into the access jack 130, provides the connection between the service side and the exchange side of the terminal block and may be embodied in a number of configurations.

As illustrated in FIGS. 1 and 2, the terminal block employs an elongated housing 10 having a plurality of wire pair openings 12 along a front surface thereof. The housing 10 is composed of a dielectric material, suitable for manufacture in the desired shape. For example, any one of several commercially available thermoplastic resins may be readily employed due to their relatively low cost and ease of manufacture. Other dielectric materials may be also employed, however.

The wire pair openings 12 are spaced apart along the length direction of the housing 10 and, as will be discussed in more detail below, provide access to service wires 18 into isolated internal chambers within the housing 10. The number of pairs of the wire openings 12 thus corresponds to the number of internal chambers and will vary with the specific application of the terminal block. In conventional U.S. telecommunications applications for providing service wire drop connections to telephone distribution cables, 2 to 50 pairs of service wires are typically connected by a single terminal block. Other applications may require different numbers of wire pairs, however. Also, for other types of applications, a single wire opening 12 instead of a pair of openings 12 may be employed for each chamber, or additional wire openings could be provided into each chamber if a need arose in a specific application. Accordingly, the configuration of openings and their spacing along the housing 10 is an illustrative embodiment only and may be varied with the specific application as needed.

Arrayed along the top of the housing 10 are a series of terminal actuators 14 equal in number to the number of chambers contained within the housing 10 and respectively positioned over each such isolated chamber. Shown in FIGS. 1 and 2 are the top portions of terminal actuators 14 and, as will be discussed in more detail below, the remainder of each actuator 14 extends through the opening 16 of the housing 10 into each respective chamber. Terminal actuators 14 are preferably made of a dielectric material which may be the same as the housing 10. The top of the terminal actuator 14 preferably has a shape which may be readily engaged and turned by a hand held wrench or other implement. Alternatively, actuator 14 may be adapted to be grasped and turned by a user of the terminal block. Turning the actuator a fixed amount, preferably indicated by visual markings on the housing and actuator, effects the termination of the service wires 18 in a manner to be discussed in more detail below.

Figure 5:
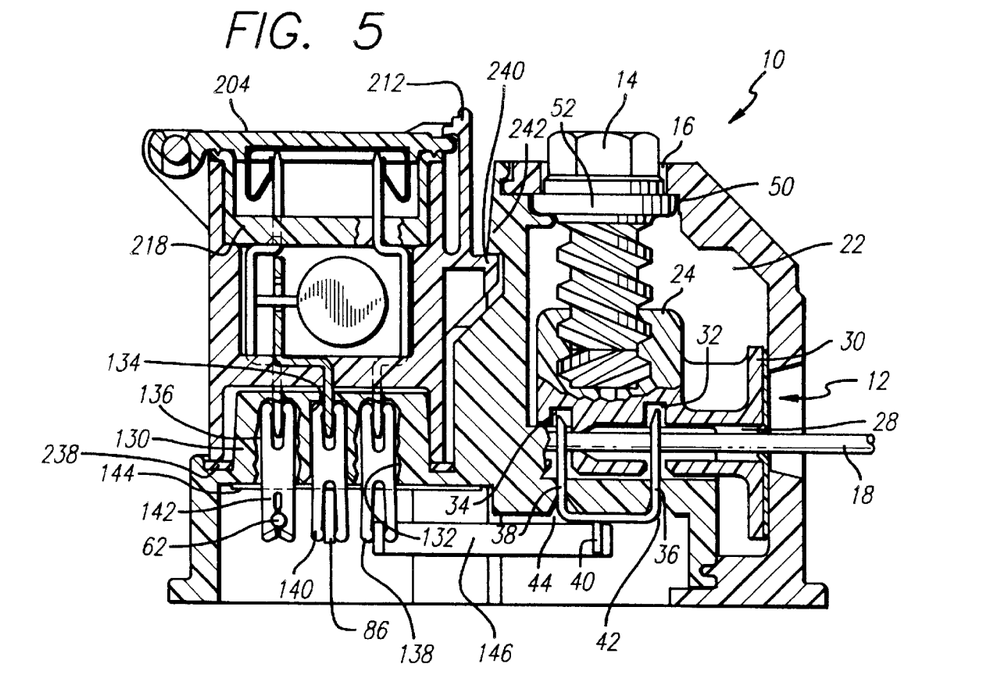
FIG. 5 is a side view taken along line 5—5 of FIG. 1 showing a cross-section of the terminal block of the present invention with a protector module embodiment of the linking module installed and the module cover in the closed position.
Figure 6:
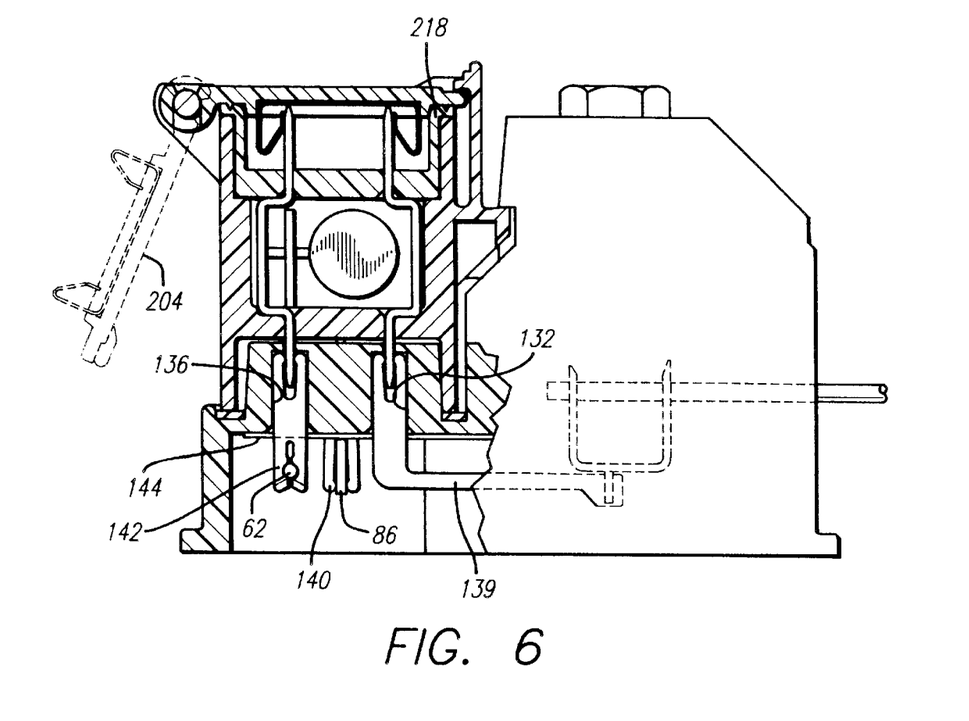
FIG. 6 is a side view taken along line 6—6 of FIG. 2 showing a cross-section of the terminal block of the present invention with a protector module embodiment of the linking module installed and the module cover in the open position.

FIG. 5 is a side view taken along line 5—5 of FIG. 1 illustrating the interior of a single chamber of the terminal block. FIG. 6 is a similar view taken along line 6—6 of FIG. 2. Since telephone lines employ pairs of conductors, the terminal block will in general have one or more pairs of contacts, etc. In the following discussion, however, connection of single wires will be referred to for simplicity.

As illustrated, each internal chamber 22 is preferably integrally formed with the tops and sides of the housing 10. The opening 16 which receives the terminal actuator 14 and the wire access slot 12 thus provides direct access into the chamber 22 from outside the housing 10. Positioned within each chamber 22 and threadedly engaged with the terminal actuator 14 is a wire carrier member 24. The terminal actuator and wire carrier member together form a termination mechanism. More particularly, the carrier member 24 has a threaded opening in the top end thereof for receiving the matching size threaded end of terminal actuator 14. Wire carrier member 24 also has a wire receiving opening 28 for receiving a service wire inserted into the chamber through the wire access slot 12. The wire receiving opening 28 extends through a flanged extension 30 of the wire carrier 24 into the central portion of the wire carrier 24. A first receiving slot 32 is provided in the carrier at a first position along the wire access opening 28 and a second receiving slot 34 is provided at a second inner position of the wire access opening 28.

The first and second receiving slots 32, 34, respectively, receive first and second insulation displacement connectors 36, 38, when the wire carrier member 24 is in the closed position illustrated in FIG. 5. The insulation displacement connectors 36, 38 extend up from a contact element 40 which is configured outside the chamber 22, which will be discussed further below. The connectors 36, 38 extend into the chamber 22 through the slots 42, 44 in the bottom of the chamber 22. The contact element 40 and the insulation displacement connectors 36, 38 are preferably made of a metallic conductor to provide good electrical contact to the service wires 18 when the connectors 36, 38 pierce the insulation thereof.

Which of the two connectors 36, 38 makes electrical contact to the wires is determined by the diameter of the wire. That is, whether the wire is extends into the first slot 32 or the second slot 34 will depend on the wire diameter. For example, a large gauge wire will only proceed along the opening 28 far enough to reach the slot 32 and will thus make electrical contact with the connector 36. A smaller gauge wire in turn will reach to the second slot 34 and make contact with the second connector 38.

The top portion of the housing 10 over the chamber 22 is provided with an annular groove 50 around the opening 16. The top end of the terminal actuator 14 is provided with a matching annular flange 52 which fits within the annular groove 50. This arrangement prevents vertical motion of the terminal actuator 14 during rotation thereof.

Figure 3:
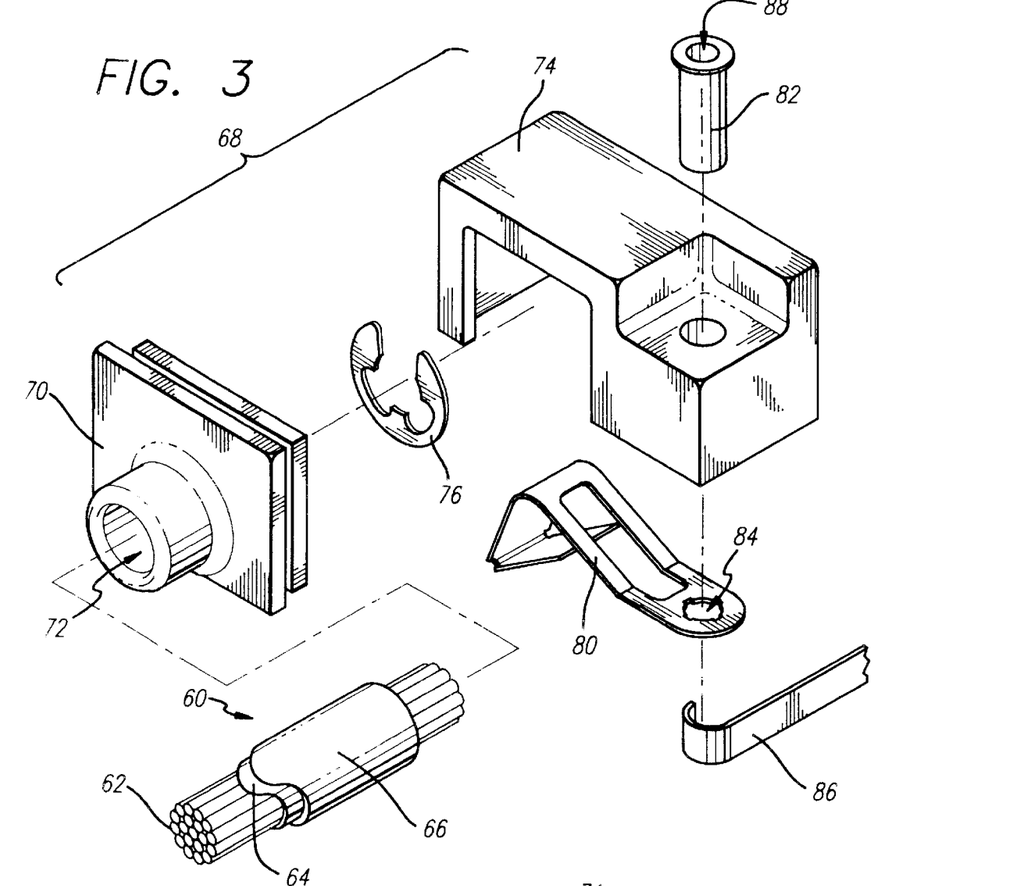
FIG. 3 is an exploded view of the basic components of the grounding components of the terminal block in accordance with the present invention.
Figure 4:
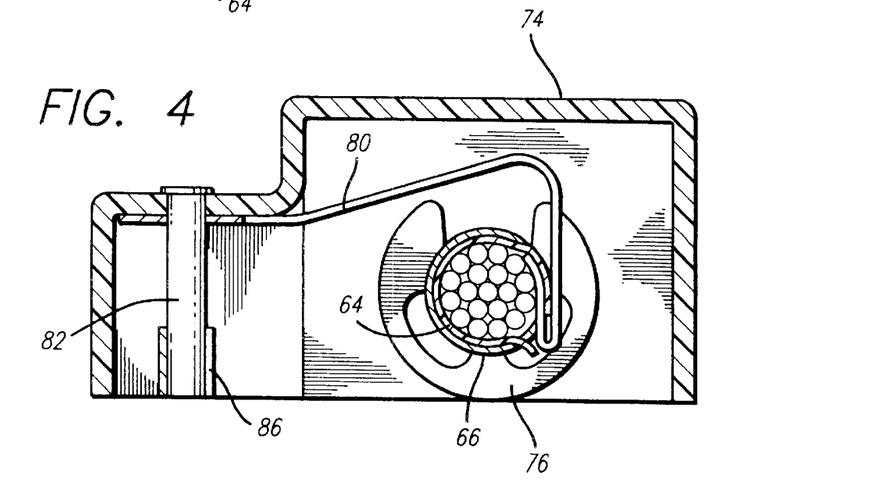
FIG. 4 is a side view taken along line 4—4 of FIG. 2 showing a cross-section of the grounding components and the connection of the stub cable of the terminal block of the present invention.

FIG. 3 provides an exploded view of the grounding components of the terminal block in accordance with the present invention and FIG. 4 is a side view taken along line 4—4 of FIG. 2 showing a cross-section of the grounding components and the connection of the stub cable of the terminal block of the present invention. As illustrated in FIGS. 3 and 4, the stub cable 60 typically includes a number of pairs of exchange wires 62, corresponding to the number of wire openings in the housing, surrounded by a conductive sheath 64 which in turn is covered by a protective sheath 66. One end of the stub cable 60 is spliced onto the distribution cable as is known in the art. The other end of the stub cable 60 is preferably retained by the terminal block through the stub cable adapter 68. The stub cable adapter 68 includes an end wall 70, a cable adapter port 72, and an adapter base 74.

The stub cable 60 is installed in the stub cable adapter 68 of the terminal block during manufacturing of the terminal block. The stub cable 60 is placed through the cable adapter port 70 in the end wall 68 and secured with a clip 76 inside the end wall 70. The clip 76 may be provided as a circlip, hose clamp or the equivalent which retains the protective sheath 66 and the stub cable against axial loads with respect to the end wall 70 of the stub cable adapter 68. The end wall 70, including the installed stub cable 60, is inserted into the adapter base 74, which is in turn secured to the housing 10, such that the end wall 70 may rely on the adapter base and housing for support against axial loads on the stub cable 60.

As best illustrated in FIG. 4, once the stub cable is installed in the stub cable adapter 68, the protective sheath covering the wires to be terminated is removed, exposing the underlying conductive sheath 64 and the exchange wires 62. The exchange wires 62 are secured to contacts within the housing as will be described further below. The conductive sheath 64 is trimmed so that the portion of the conductive sheath proximate the interior portion of the stub cable adapter 68 remains. The conductive sheath 64 is secured to earth potential using a sheath connector 80. The sheath connector 80 is formed from an electrically conductive strip of metal, or wire, such as copper or aluminum. One end of the sheath connector 80 is conductively secured to the conductive sheath 64 by forming the sheath connector 80 around a portion of the conductive sheath 64 and crimped so as to mechanically capture a portion of the conductive sheath 64. Alternatively, the sheath connector may be conductively secured to the conductive sheath 64 through conventional means such as soldering or other conductive fixatives.

The second end of the sheath connector 80 within the stub cable adapter 68 is secured to a ground post 82, which may be provided as an electrically conductive rivet. Preferably the second end of the sheath connector 80 includes an aperture 84 which may be retained by the ground post 82. The sheath connector 80 is secured to the ground post 82 through the aperture 84 when the ground post is inserted into the adapter base 74 of the stub cable adapter 68. In the alternative, the ground post 82 may be conductively secured to the sheath connector 80 by conventional means such as soldering or conductive fixatives. Further, the ground post 82 may be conductively secured directly to the conductive sheath 64, through soldering or conductive fixatives, if so desired.

The ground post 82 may provide the ground connection to the terminal block ground strip 86. The ground strip 86 is electrically conductive and provides an electrically conductive connection between each ground contact within each terminal block, discussed further below, and earth potential. Although grounding could be provided to each ground contact within the terminal block with individual wires, preferably a ground strip 86 is employed for ease of manufacturing. The ground strip 86 is conductively connected to the ground post 82 by conventional means such as soldering or crimping.

The ground post 82 further includes a central bore 88. The post is attached to earth potential, using an electrically conductive connection, through a grounding cable (not shown) which may be provided as a wire mesh cable or other electrically conductive cable as is known in the art to conductively connect telecommunications terminal blocks to earth potential upon installation. The grounding cable may be secured to the ground post 82 through the central bore 88. Once the grounding cable is conductively secured to the ground post 82, each ground contact within the terminal block and the conductive sheath are connected to earth potential.

As illustrated in FIGS. 5 and 6, the housing 10 also includes an access jack 130 to which a linking module 200 may be removeably secured. The linking module 200, when inserted into the access jack 130, provides the connection between the service side and the exchange side of the terminal block and may be embodied in a number of configurations as will be discussed further below.

The access jack 130 preferably includes a total of five slots wherein are retained five contacts. The configuration and number of contacts may vary with the application. For example, a terminal block without a need for surge protection could employ four slots and if only a single wire was to be terminated, perhaps an access jack of only three (protected) or two (unprotected) slots would be required. The embodiment described herein includes a protected linking module, which includes five slots and corresponding contacts.

With the exception of the earth connection, only those components defining a single conductive path through the terminal block are described, although the detailed description applies equally to both conductive paths. The access jack 130 preferably includes a service wire junction contact slot 132, an earth junction contact slot 134 and an exchange wire junction contact slot 136. Each of these slots serves a dual purpose. First, each slot permanently retains the contacts for specified contacts within the housing 10. Second, each slot is adapted to receive a corresponding contact from the linking module 200 to permit the contacts from the linking module 200 to form a conductive connection with the contacts within the access jack 130 of the housing 10.

The service wire junction contact slot 132 retains the service wire junction contact 138; the earth junction contact slot 134 retains the earth junction contact 140; and the exchange wire junction contact slot 136 retains the exchange wire junction contact 142. Each contact retained within the access jack has an access jack side and a housing side. Both ends of the service wire junction contact 138 and the earth junction contact 140 are formed with friction-fit forks to permit easy connection with a conductive metal prong. The exchange wire junction contact 142 has a friction-fit fork connector on the access jack side and an insulation displacement connector on the housing side. Therefore, each of the slots formed within the access jack 130 has retained therein a conductive, friction-fit fork adapted to receive a conductive prong.

Each contact in the access jack is press-fit into its corresponding slot within the access jack during manufacture and retained therein. As shown in FIGS. 5 and 6, before the contacts are installed, a sealing plate 144 comprised of a thick adhesive tape membrane is applied to the bottom side of the block. The sealing plate is coated with an adhesive on the side of the plate secured to the bottom side of the access jack to secure the plate to the access jack. The contacts, during installation, are pushed through the sealing plate 144 until they bottom out within the access jack 130. The contacts, once installed, are sealed within their respective slots by the sealing plate 144. The sealing plate may be formed of a suitable plastic or rubber material capable of retaining an adhesive on one side and having elastic qualities to permit the contacts to be pushed through the material during installation.

As illustrated in FIG. 5, a service wire jumper bar 146 is provided to conductively connect the housing side of the service wire junction contact 138 to the contact element 40. The jumper bar 146 is formed of a conductive metal with one end secured to the contact element 40 and the other end bent at a right angle to conveniently fit into the service wire junction contact 138. To minimize manufacturing costs, this connection may be made by simply pressing each respective end of the jumper bar into the friction-fit forks provided by each contact.

Alternatively, the connection between the service wire junction contact 138 and the contact element 40 could be made with a jumper wire soldered to each end or mechanically connected using other techniques known in the art to connect two conductive, but physically separated conductors.

In yet another alternative, the service wire junction contact 138, the jumper bar 146, the contact element 40 and the first and second insulation displacement connectors 36, 38 may be integrally formed in one or more conductive portions to provide a conductive path between a service wire and the service wire junction contact 138 within the access jack 130. For example, as shown in FIG. 6, preferably the service wire junction contact 138 and jumper bar 146 are integrally formed as an integrated service wire junction contact 139 to improve reliability and manufacturability.

The ground strip 86 is formed as an elongated bar, similar to that of the jumper bar 146, sized in thickness to be received by a friction-fit conductive fork such as the housing side of the earth junction contact 140. The ground strip 86 is conductively secured to the ground post 82 of the stub cable adapter 68 and extends the length of the housing 10 directly beneath the housing side of each of the earth junction contacts 140. The ground strip 86 is inserted into the housing side of the earth junction contacts 140 and captured by the friction-fit forks. Alternatively, a jumper wire, as is known in the art, may be used to form a conductive connection between the ground post 82 and each earth junction contact 140. The jumper wire may be secured using solder, conductive fixatives or other mechanical techniques known in the art to connect two conductive, but physically separated conductors. In yet another alternative, the earth junction contact 140, the ground strip 86 and the ground post 82, may be formed of one or more conductively connected portions to provide earth potential to the housing side of each earth junction contact 140.

The housing side of the exchange wire junction contact 142 is formed as an insulation displacement connector. Once the stub cable is installed in the stub cable adapter 68, as described above, each exchange wire 62 is connected to a corresponding insulation displacement connector on the housing side of each corresponding exchange wire junction contact 142.

Once the exchange wires 62; contacts 138, 140 and 142; sealing plate 144; and necessary jumpers are installed in the housing 10, the cavity in the base of the housing containing the portions of the above elements is filled with a hard encapsulant such as a non-conductive epoxy. The epoxy protects the conductive contacts from the environment and ensures all elements and conductive connections remain securely fastened in place. The permanent connection between the stub cable and the exchange side of the terminal block provides a physically robust connection to withstand the recurring installing and removing of connections on the service side. The other end of the stub cable is connected to selected wire pairs from the distribution cable during installation in the field.

As illustrated in FIGS. 5–11, the terminal block of the present invention includes a linking module 200. The linking module 200 connects the service and exchange sides when plugged into the five-prong access jack 130. The linking module 200 includes a path for each of two wire connections between the exchange side and the service side. Preferably the linking module includes a basic configuration referred to herein as a bridge module having contacts which provide a connection between the service side wires and exchange side wires. The embodiments of the bridge module are discussed further below with regard to FIGS. 8–11.

Figure 7:
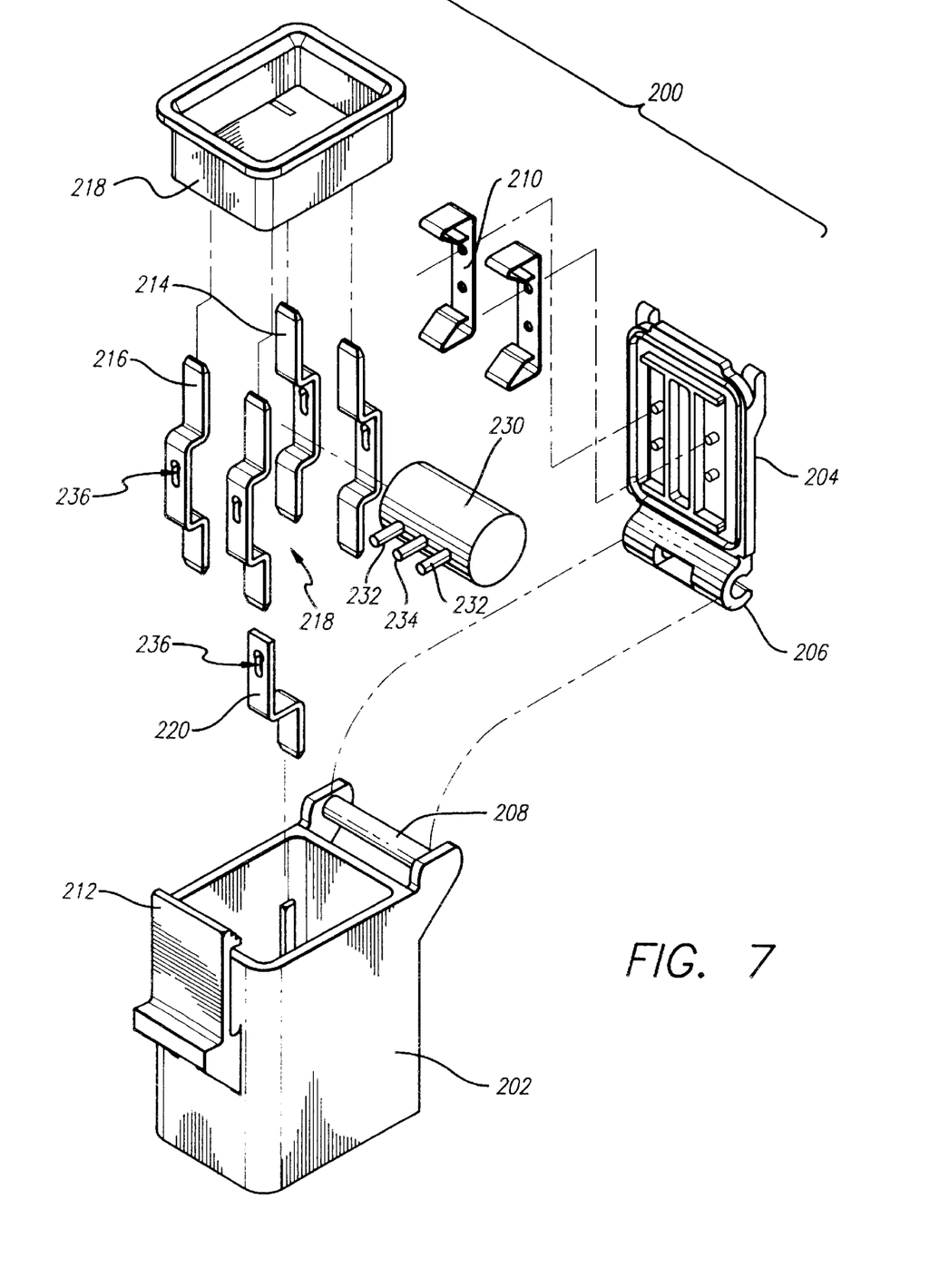
FIG. 7 is an exploded view of the basic components of the protector module embodiment of the linking module in accordance with the present invention.

As illustrated in FIG. 7, the linking module may be embodied as a two-way test module or a protected two-way test module. The protected two-way test module embodiment of the linking module 200, connects the service and exchange sides when plugged into the access jack 130, and includes a protection device 230 and a protector earth contact 220. In either of the two-way test module embodiments the linking module 200 includes a configuration of the contacts which permits testing either the exchange side or the service side without disconnecting the exchange side or service side wires.

To simplify the description of the two-way test module embodiment, and to avoid unnecessarily cluttering the drawings, only those components defining a single conductive path through the module are described, although the detailed description applies equally to both conductive paths.

The two-way test module embodiment of the linking module 200 includes a module housing 202 and a hinged cover 204. The module housing 202 and cover 204 are preferably made of a dielectric material which may be the same as housing 10 (as illustrated in FIG. 1). The hinge 206 is integrally formed with cover 204 so that hinge and cover comprise a single unit. The hinged cover 204 is rotatably secured to the housing by pin 208 which is integrally formed with the housing. The hinged cover 204 includes a U-shaped contact 210 which is secured to the interior of the hinged cover and formed of a metallic, conductive material such as brass, although other sufficiently conductive materials would perform adequately.

Within the module housing 202 are secured a set of test contacts and a protector earth contact 220. The set of test contacts includes a service wire test contact 214 and an exchange wire test contact 216. Each contact is formed of a metallic, conductive material similar to that of the contact 210. The service wire test contact 214 and the exchange wire test contact 216 have a test side, an access jack side, and a plurality of bends therebetween which create an area 218 into which a protection device 230 may be inserted. The protector earth contact 220 has a first end which is conductively connected to the protection device 230 and a second end which may be conductively connected to the earth junction contact 140 at earth potential when the linking module 200 is plugged into the access jack 130.

As illustrated in FIGS. 5 and 6, the cover 204 may be opened or closed. In the closed position, the cover 204 is latched shut with an integrally formed latch 212. The latch may be manually released to permit the cover to be opened. When closing the cover 204 of the linking module 200, the test side of each contact 214, 216 are distanced from each other to permit the insertion of the contact 210 therebetween to form a conductive connection between the service wire test contact 214 and the exchange wire test contact 216. Therefore, upon closure of the cover, the service side and exchange side are conductively connected.

To open the linking module cover 204, an operator manipulates the latch 212 laterally toward the actuator 14. Manipulation of the latch is facilitated by forming the latch to the linking module housing in a cantilevered manner. When the cover 204 is opened, the conductive connection between the service side and the exchange side is broken.

The service wire and exchange wire test contacts 214 and 216, the protector earth contact 220 and the protection device 230 are maintained within the linking module 200 with a hard encapsulant such as a non-conductive epoxy. The hard encapsulant only occupies a portion of the interior of the linking module 200. The remainder of the interior of the linking module 200 is protected from the environment by a cover gasket 218. The cover gasket 218 is constructed of an elastic material known in the art and capable of serving as an environmental barrier. The cover gasket 218 protects the service wire test contact 214, the exchange wire test contact 216 and the protection device 230 from the environment. Preferably, the interstitial space between the encapsulant and the cover gasket is filled with an insulating media which further protects these elements from the environment.

Portions of contacts 214 and 216 are exposed above the cover gasket 218 so, upon opening the cover 204, an alligator-type or equivalent test connector can be conveniently connected to either the service wire test contact 214 or the exchange wire test contact 216 to test one side or the other for more accurate diagnostic testing.

FIGS. 5 and 6 illustrate the mechanism for securing the linking module 200 to the access jack 130 of the terminal block housing. As shown, housing 202 of the linking module 200 includes a locking rib 240 integrally formed with the housing 202 on the side of the linking module proximate the terminal block housing. The terminal block housing 10 includes a linking module retainer 242 adapted to capture the locking rib 240 when the linking module 200 is fully inserted into the access jack.

To release the linking module the technician may simultaneously apply downward pressure on the linking module and urge the top portion of the linking module in the direction away from the actuator to ensure the locking rib 240 clears the retainer. Securing the linking module with the locking rib 240 and retainer 242 provides greater confidence in retaining the linking module through difficult environmental conditions.

FIG. 5 illustrates the access jack gasket 238 which is used to provide a seal between the linking module 200 and the access jack 130 of the housing 10 once the linking module has been inserted into the access jack. The access jack gasket 228 is constructed of an elastic material known in the art and capable of serving as an environmental barrier between the access jack 130 and the external environment. The gasket provides a seal such that once the linking module is snapped into place over the access jack 130, no environmental contaminants or moisture may enter the junction contact area.

In the protected embodiment of the two-way test module, the linking module 200 includes a protection device 230 conductively connected within the linking module for protecting two circuits. The protection device 230 typically includes three conductive rings, one ring encircling the circumference of each end of the protection device 230 and culminating in conductive pins 232; and a third ring encircling the middle of the protection device 230 and culminating in conductive pin 234. Each of the rings is conductively secured to a corresponding pin. Each of the three pins may be conductively secured to a corresponding aperture 236 formed in the earth protector contact 220 and either the exchange wire test contact 216 or the service wire test contact 214.

Therefore, in an embodiment including two conductive paths for two service wire terminations, the exchange wire test contacts 216 are conductively connected to the each end of the protection device 230 through the conductive pins 232, respectively, and the protector earth contact 220 is conductively connected to the middle ring through conductive pin 234. In the alternative, the service wire test contacts 214 are conductively connected to the end rings through the conductive pins 232, respectively, and the protector earth contact 220 is conductively connected to the middle ring through conductive pin 234. Once the linking module 200 is plugged into the access jack 130, and the cover 204 is in the closed position, the two primary conductive paths between the exchange side and the service side are protected from intermittent destructive voltage levels.

The protection device 230 may be provided as a gas discharge tube as illustrated in FIG. 7, and as disclosed, for example, in U.S. Pat. No. 4,866,563, entitled "Transient Suppressor Device Assembly," herein incorporated by reference. A gas discharge tube has three conductive rings encircling the circumference of each of the ends of the tube and a third ring encircling the middle of the tube.

Alternatively the protection device 230 may be provided as solid state device to provide faster response to voltage surges. Modern telecommunication systems may be particularly sensitive to voltage surges so as to be destroyed by them before a typical gas discharge tube has triggered its protection. Therefore, higher speed, solid state protector devices, such as disclosed in U.S. Pat. No. 4,796,150, entitled "Telecommunication Protector Unit With Pivotal Surge Protector," herein incorporated by reference, may be used in the linking module of the present invention.

Further, in certain settings a voltage surge may be both fast and register a significant potential which could overwhelm a purely solid state device. In such cases it may be advisable to provide a hybrid protection device including a gas discharge tube capable of shunting a significant potential in combination with solid state components capable of faster response. Such a combination may handle high-speed, high-potential voltage surges to permit reliable protection across a broad spectrum of risk.

Regarding operation of the protected two-way test module embodiment of the linking module, when a voltage surge occurs, for example, the open circuit between the conductive pin 232 at either end of the protection device 230 and the conductive pin 234 at the middle of the protection device 230 closes through the protection device 230 and the voltage surge is shunted to earth, thus protecting the telecommunications equipment conductively connected to the conductive path. Once a voltage surge has occurred, forcing the protector device 230 to connect to earth potential, the used protector may be replaced by removing the linking module and replacing it with a new linking module. The replacement occurs without disrupting the service side or exchange side terminations.

FIGS. 8–11 illustrate several embodiments of the bridge module 300 embodiment of the linking module 200. The bridge module embodiment connects the service and exchange sides when plugged into the access jack 130. The bridge module 300 includes a path for each of two wire connections between the exchange side and the service side. To simplify the description, and to avoid unnecessarily cluttering the drawings, only those components defining a single conductive path through the bridge module are described, although the detailed description applies equally to both conductive paths.

Figure 8:
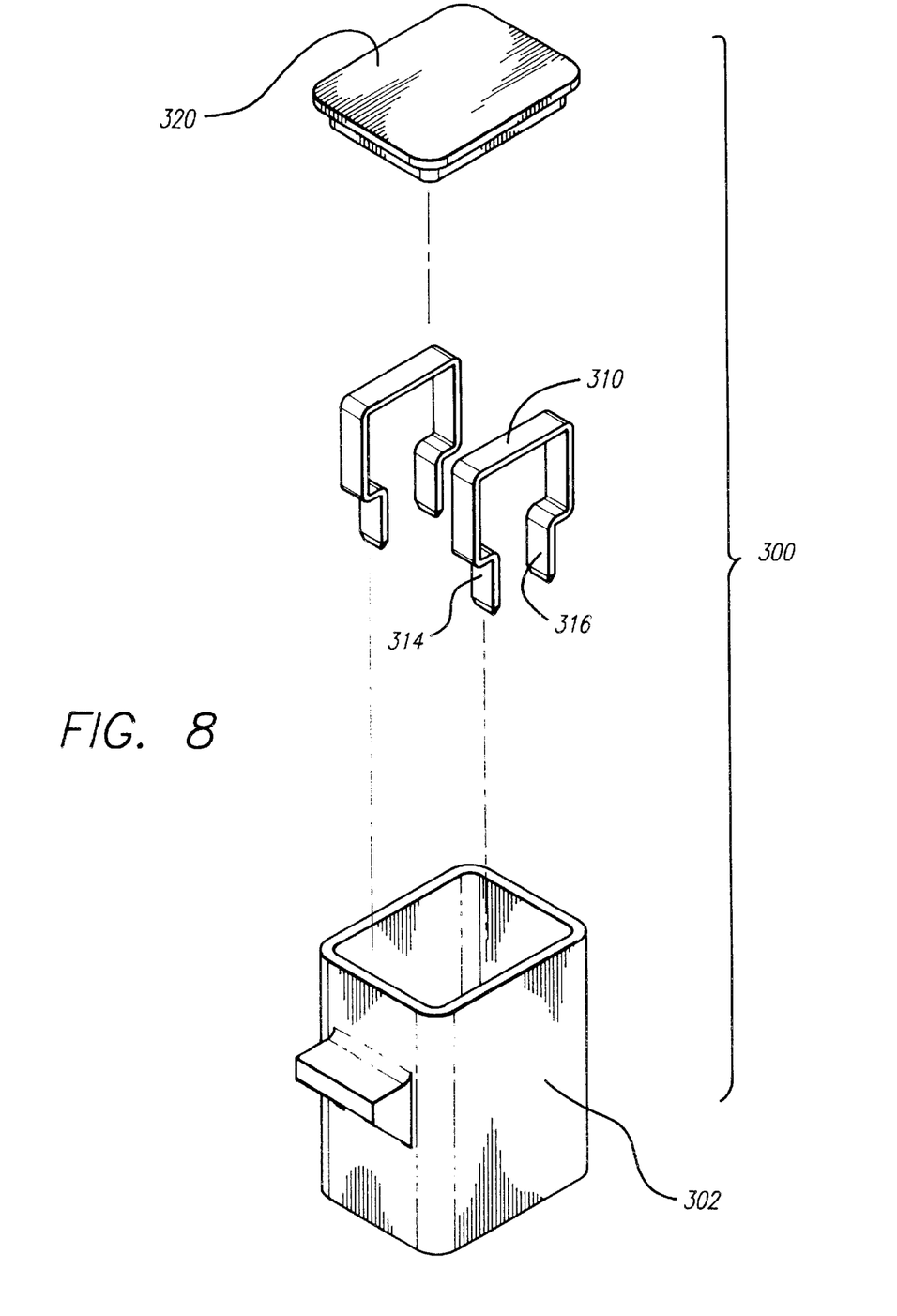
FIG. 8 is an exploded view of the basic components of a first embodiment of the bridge module embodiment of the linking module in accordance with the present invention.

The bridge module 300 illustrated in FIG. 8 includes a housing 302 and a set of integrally formed bridge contacts 310. Each bridge contact 310 includes a service wire junction contact 314 and an exchange wire junction contact 316. The contacts are maintained within the bridge module with a hard encapsulant such as a non-conductive epoxy. The module is enclosed by a cover 320. In operation, when the bridge module is plugged into access jack 130 the service side is connected to the exchange side via the bridge contact 310.

Figure 9:
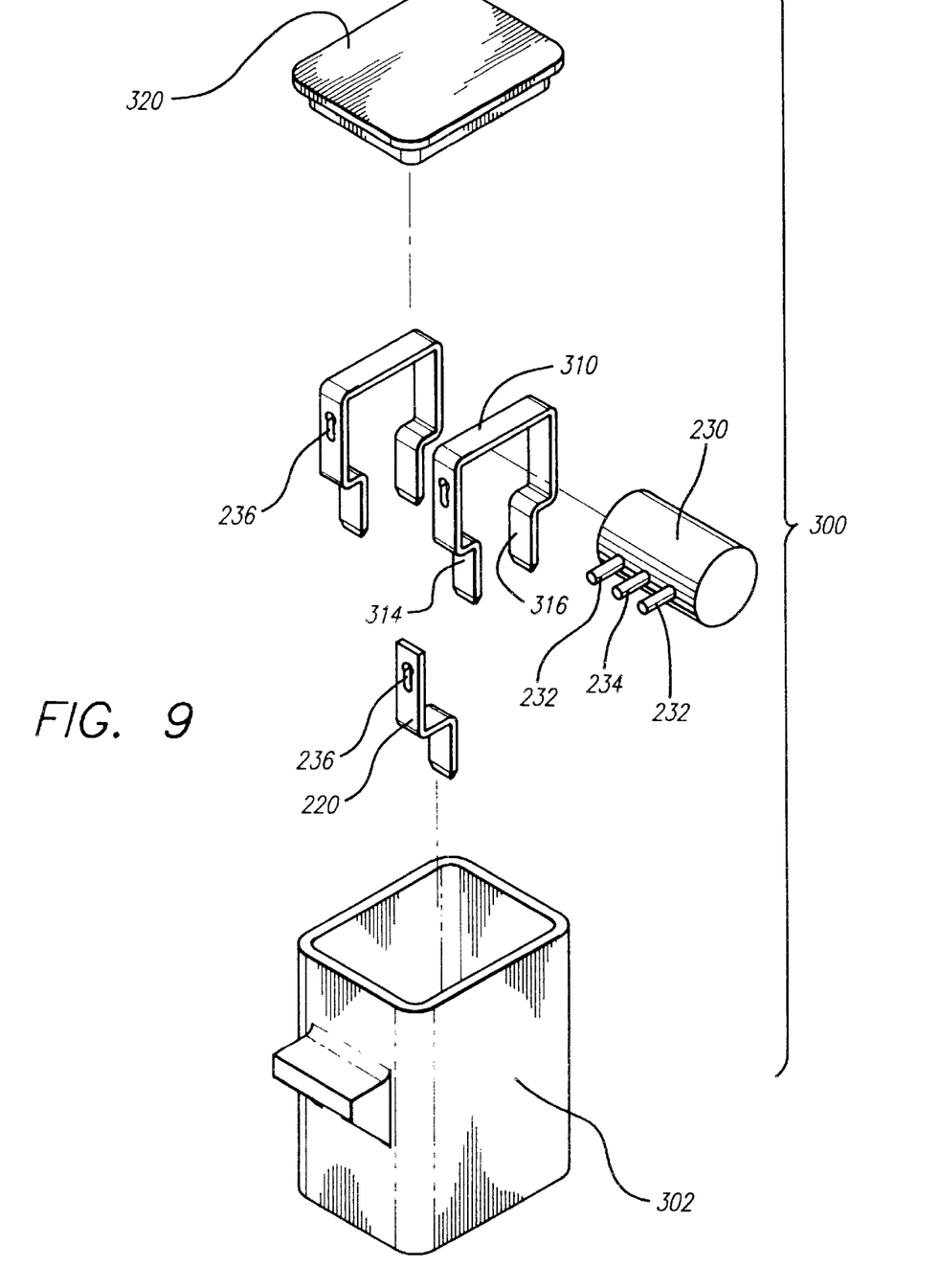
FIG. 9 is an exploded view of the basic components of a second embodiment of the bridge module embodiment of the linking module in accordance with the present invention.

The bridge module 300 illustrated in FIG. 9 is identical to the bridge module 300 illustrated in FIG. 8, the description of which is incorporated herein by reference, but further includes a protection device 230 and a protector earth contact 220. The bridge contact 310 includes an aperture 236, as described above with regard to FIG. 7, which retain pins 232 and 234 from the protection device 230. The contacts and protection device 230 are maintained within the bridge module with a hard encapsulant such as a non-conductive epoxy. The module is enclosed by a cover 320. In operation, when the protected bridge module is plugged into access jack 130 the service side is connected to the exchange side via the bridge contact 310 and each conductive path is protected by the protection device 230 connected to earth via the protector earth contact 220 as described with regard to FIG. 7, above.

Figure 10:
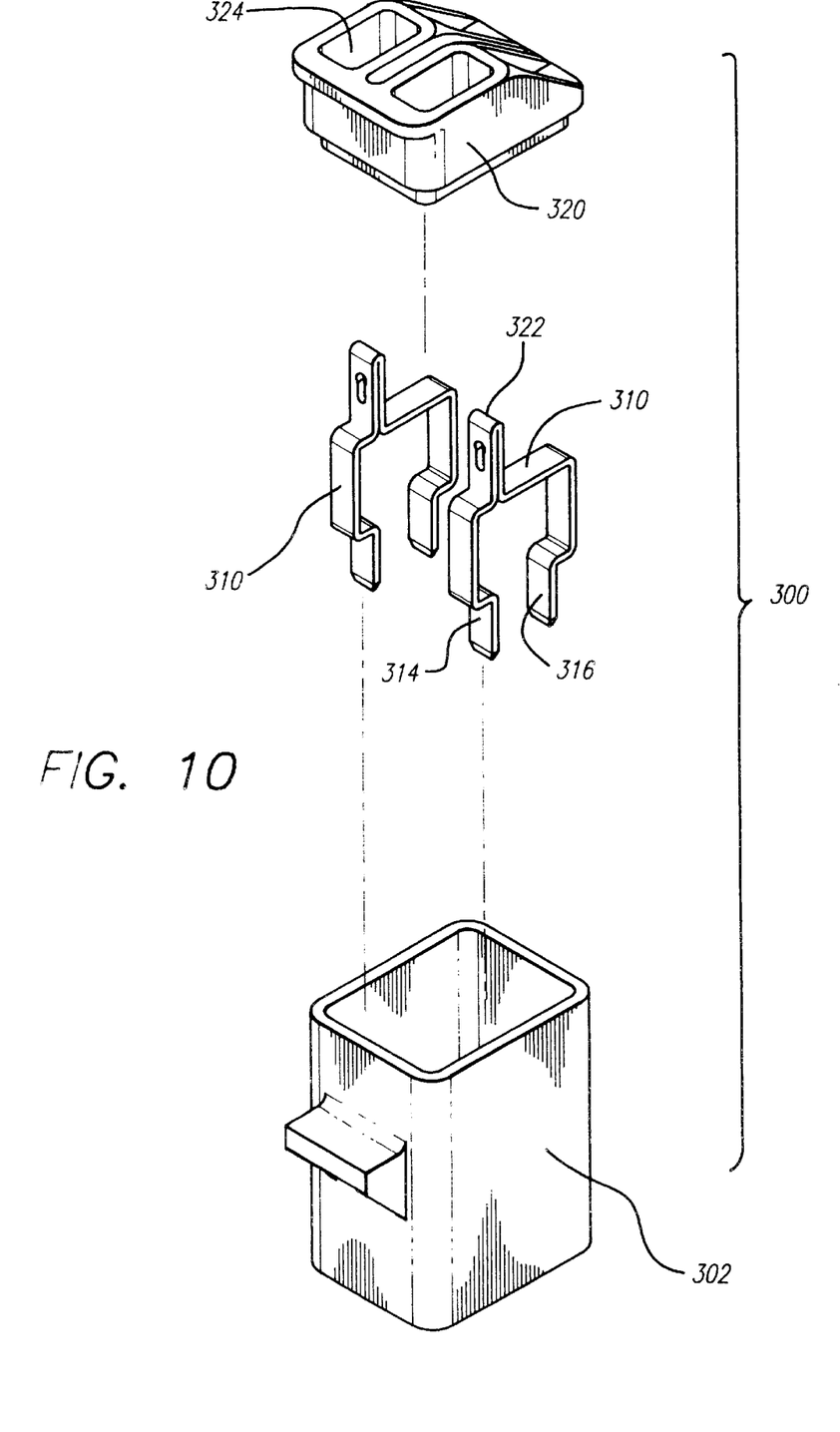
FIG. 10 is an exploded view of the basic components of a third embodiment of the bridge module embodiment of the linking module in accordance with the present invention.
Figure 11:
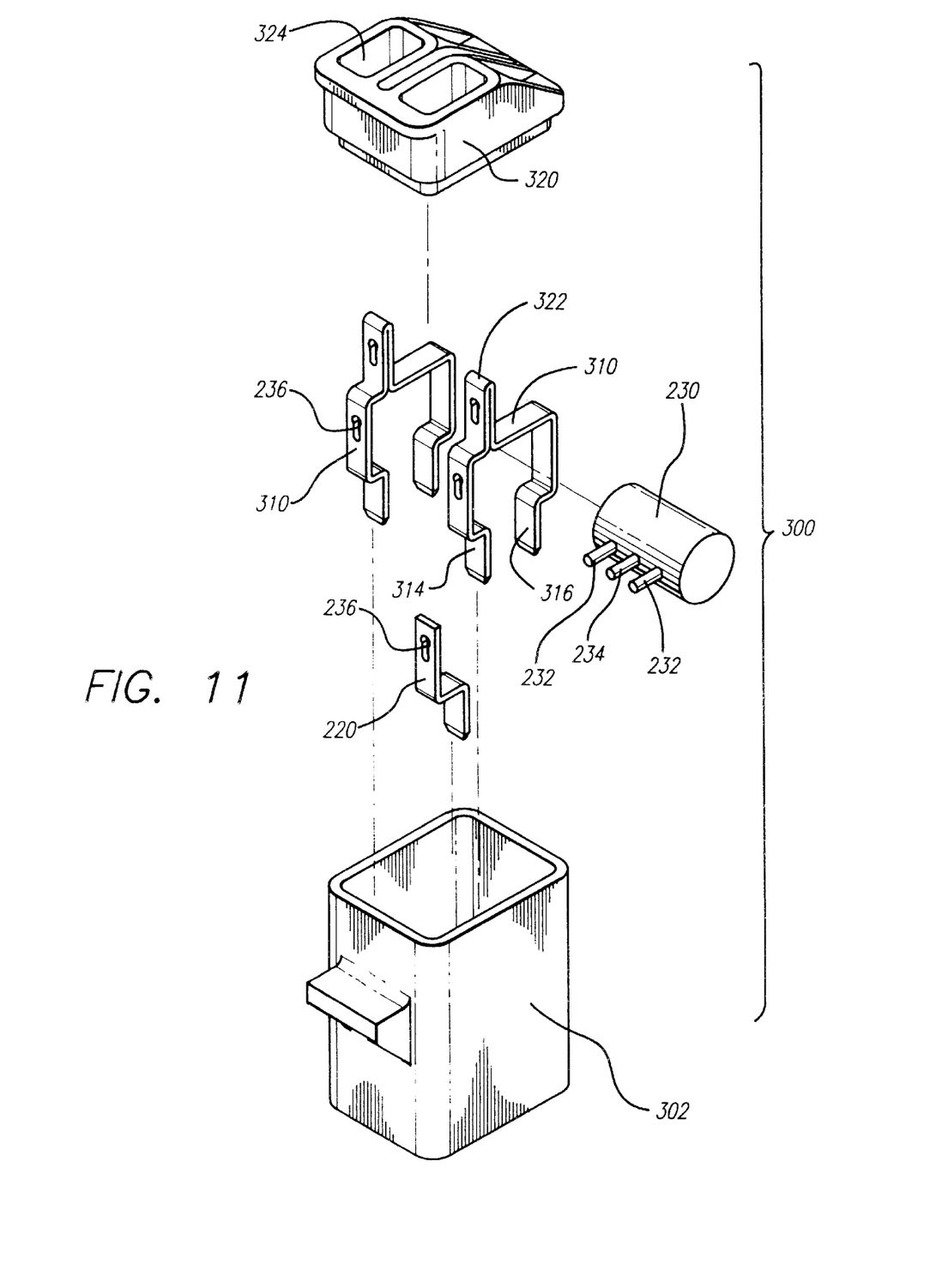
FIG. 11 is an exploded view of the basic components of a fourth embodiment of the bridge module embodiment of the linking module in accordance with the present invention.

In an alternate embodiment, the bridge module 300 may be provided with a test port as illustrated in FIGS. 10 and 11. The bridge module of FIG. 10 is identical to the bridge module 300 illustrated in FIG. 8, the description of which is incorporated herein by reference, but further includes a test contact 322 integrally formed with bridge contact 310. Further, the cover 320 includes a test contact opening 324 for each test contact 322. In operation, when the bridge module 300 is plugged into access jack 130 the service side is connected to the exchange side via the bridge contact 310. A test probe, in the form of an alligator clip, for example, may be secured to a test contact 322 to perform diagnostic tests on the conductive connection between the service side and the exchange side while maintaining the conductive connection between the two sides.

The bridge module 300 illustrated in FIG. 11 is identical to the bridge module 300 illustrated in FIG. 10, the description of which is incorporated herein by reference, but further includes a protection device 230 and a protector earth contact 220. The bridge contact 310 includes an aperture 236, as described above with regard to FIG. 9, which retain pins 232 and 234 from the protection device 230. The contacts and protection device 230 are maintained within the bridge module with a hard encapsulant such as a non-conductive epoxy. The module is enclosed by a cover 320.

In operation, when the protected bridge module illustrated in FIG. 11 is plugged into access jack 130 the service side is connected to the exchange side via the bridge contact 310 and each conductive path is protected by the protection device 230 connected to earth via the protector earth contact 220 as described with regard to FIG. 7, above. Further, a test probe in the form of an alligator clip, for example, may be secured to one or more test contacts 322 to perform diagnostic tests on the conductive connection between the service side and the exchange side while maintaining the conductive connection between the two sides.

The protected two-way testing module embodiment of the linking module 200 as well as the embodiments of the bridge module described herein may be used interchangeably, in conjunction with the access jack 130, depending on the application desired by the user.

Referring to FIG. 5, prior to use of the terminal block of the present invention for exchange wire and service wire connection, and preferably during manufacture or assembly of the terminal block, a suitable insulating medium is injected into chamber 22 and above the hard encapsulant within the module 200 so as to fill all the voids and the wire openings in the terminal block. Any one of a large number of well known commercially available greases, gels and other insulating mediums may be employed, depending on the specific requirements of the application.

The viscosity and adhesive qualities of the medium should be such that wires may be inserted to and removed from openings 12, without adhering excessively to the medium. The medium should be sufficiently flowable so as to flow around the service wire carrier 24 as it moves therethrough. The medium may be injected into the chamber 22 through terminal actuator 14 through a central bore therein. This central bore in terminal actuator 14 is then secured with a plug to ensure the medium remains within the chamber once the chamber is filled. The medium is also injected through the gasket 218 to fill the linking module 200. Injection of the medium may be performed after assembly of the terminal block. Also, the medium may be pumped in after being precured outside of the block in the case of a curable medium such as a gel, or may be injected in an uncured state and subsequently allowed to cure.

In view of the foregoing structural description of the terminal block, its functional features may be readily appreciated in consideration with FIGS. 5–7. In the field, the selected exchange wires from the distribution cable are conductively secured to the exchange wires 62 of the stub cable through techniques which are known in the art of cable splicing and have been described above. Thus each exchange wire from the distribution cable is conductively connected to the exchange wire junction contact 142 within the exchange wire junction contact slot 136. The ground potential is conductively connected, through the ground strip 86, to the earth junction contact 140 within the earth junction contact slot 134.

The service wires desired to be connected to the terminal block are inserted into openings 12 into the service wire carrier 24 configured in a first position, wherein the wire carrier 24 has not engaged the service wire. In this position, the wires may be readily inserted into the interior of carrier 24 displacing only a very moderate amount of insulating medium. Once the wires have been inserted into the opening 30 the user of the terminal block rotates terminal actuator 14 which in turn drives the service wire carrier 24 downward due to the threaded engagement of actuator 14 and the carrier member 24. The medium is prevented from exiting through the center portion of the actuator by a plug. Actuator 14 is rotated until the carrier 24 is driven down to the second position illustrated in FIG. 5. In this position, the wires have been forced into contact with insulation displacement connectors 36, 38. Insulation displacement connectors 36, 38 slice through the insulation on the service wire providing good electrical contact to the inner conductive core of the wire.

During the downward motion of the service wire carrier 24, from the first position to the second position shown in FIG. 5, the insulating medium inside chamber 22 will flow around the sides of service wire carrier 24 so as to be displaced from the bottom to the top portion of the chamber 22. In this regard, vertical channels may be provided on service wire carrier 24 to facilitate the flow of the insulating medium around the carrier member as it is driven from the first to second position by rotation of actuator 14. Thus, despite the forcing down of the service wire carrier 24 and the wires connected thereto, the volume of insulating medium in the chamber 22 remains substantially constant, avoiding the outflow of medium and/or the creation of any voids which could allow the entry of moisture or contaminants from the environment.

In order to conductively connect the service side to the exchange side using linking module 200, the linking module 200 is plugged into the access jack 130. The contacts of the linking module 200 on the access jack side of the service wire test contact 214, the exchange wire test contact 216 and the protector earth contact 220, respectively, are inserted into the service wire junction contact slot 132, the exchange wire junction contact slot 136, and the earth junction contact slot 134. Within these slots, the access jack side of the service wire test contact 214, the exchange wire test contact 216 and the protector earth contact 220, respectively, are conductively connected via a friction-fit with the service wire junction contact 138; the exchange wire junction contact 142; and the earth junction contact 140. Assuming the cover 204 is closed, once the linking module is plugged into the access jack 130, the two primary conductive paths between the exchange side and the service side are protected from intermittent destructive voltage levels.

The service side wires may be removed by reversing the terminal actuator movement. Reversing the rotation of the terminal actuator forces the service wire carrier upward, disengaging the service wires from the first and second insulation displacement connectors 36, 38. Once disengaged the wire may be pulled out of the terminal block housing. In this manner service wires may be terminated, removed and replaced in the same terminal block, as required.

Accordingly, it will be appreciated that the terminal block of the present invention provides significantly improved environmental protection and allows the multiple connection and disconnection of service wires to the terminal block without significant loss of insulating medium and concomitant loss of environmental protection capability. Furthermore, the present invention provides a terminal block which is simple to use and which is simple mechanically and not prone to failure even after repeated connections and disconnections. In addition, the terminal block of the present invention provides a replaceable linking module for conveniently and safely connecting the exchange and service sides, as well as protecting them from voltage surge, and an access jack for use by additional modules as desired. Furthermore, the present invention provides a linking module which is simple to use, easy to fabricate, and not prone to failure even after repeated connection and reconnection.

Further, the terminal block has been optimized for ease of manufacture. As illustrated, each of the components of the terminal block within housing 10 is moved into position and captured by the housing components. Thus, it will be appreciated that the present invention, in addition to providing the features described above, may also be manufactured in a cost-effective manner, readily compatible with existing manufacturing technologies.

While the foregoing description has been of a presently preferred embodiment of the present invention, it should be appreciated that the terminal block of the present invention may be modified in a wide variety of ways while still remaining within the spirit and scope of the present invention. For example, the specific configurations of the housing, the linking module and the service wire carrier may all be varied to meet specific manufacturing considerations or for other reasons without departing from the spirit and scope of the present invention. Furthermore, while the present invention has been described as a terminal block adapted for use with insulated exchange and service side wires, the present invention may equally well be employed with bare exchange or service wires.

Additional variations and modifications of the preferred embodiment described above may also be made as will be appreciated by those skilled in the art and accordingly the above description of the present invention is only illustrative in nature. The invention is further defined by the following claims.

What is claimed is:

1. A terminal block for terminating at least one exchange wire to at least one service wire, the terminal block comprising:
    a housing;
    a plurality of access jacks integrally formed with said housing, each said access jack comprising a service wire junction contact, an earth junction contact and an exchange wire junction contact;
    a plurality of service wire termination mechanisms on or within said housing, wherein each of said service wire termination mechanisms is adapted to provide an electrically conductive connection from a service wire to a service wire junction contact;
    a plurality of exchange wires each electrically connected within said housing to a separate exchange wire junction contact; and
    at least one replaceable lining module removably inserted into a selected one of said plurality of access jacks, wherein said linking module provides a conductive connection between said service wire junction contact and said exchange wire junction contact and, based on a configuration of said linking module, and requiring no change in wiring of said exchange wires and said service wires to said terminal block, selectively to said earth junction contact.

2. A terminal block as in claim 1, wherein said linking module comprises:
    a cover having an open and a closed position;
    a conductive contact secured in said cover;
    a service wire test contact in conductive communication with said service wire junction contact; and
    an exchange wire test contact in conductive communication with said exchange wire junction contact, wherein said contact of said cover in said closed position provides a conductive connection between said service wire junction contact and said exchange wire junction contact.

3. A terminal block as in claim 2, wherein said cover in said open position severs said conductive connection and exposes said service wire test contact and said exchange wire test contact such that a service signal and an exchange signal may be independently tested.

4. A terminal block as in claim 2, said linking module further comprising a protection device including a first conductive connection to one of said service wire test contact and said exchange wire test contact and a second conductive connection to said earth junction contact.

5. A terminal block as in claim 4, said terminal block further comprising means for grounding said earth junction contact to earth.

6. A terminal block as in claim 4, said terminal block further comprising:
    a ground strip conductively connected to said earth junction contact; and
    a stub cable adapter, wherein said stub cable adapter includes a ground post conductively connected to said ground strip.

7. A terminal block as in claim 6, said terminal block further comprising a sheath connector conductively connected to said ground post and a conductive sheath provided with the stub cable, wherein when said ground post is connected to earth, said stub cable and said earth junction contact are conductively connected to earth.

8. A terminal block as set out in claim 4, wherein said protection device comprises a gas discharge tube protector.

9. A terminal block as set out in claim 4, wherein said protection device comprises a hybrid solid state and gas discharge tube protector.

10. A terminal block as set out in claim 4, wherein said protection device comprises a solid state protector.

11. A terminal block as in claim 1, wherein each said service wire termination mechanism is configured within said housing in a corresponding chamber and comprises a wire carrier member configured in said housing, wherein each said chamber has a corresponding access port through the housing, said wire carrier member having an opening for receiving a wire inserted through said access port.

12. A terminal block as in claim 11, wherein said service wire termination mechanism within said housing further comprises:
    an actuator mechanism, coupled to said wire carrier member and adapted to move said wire carrier member within said housing and relative to said actuator mechanism in a manner such that the actuator mechanism does not change its degree of entry into the housing.

13. A terminal block as in claim 11, wherein said chamber is adapted to receive an electrically insulating medium and wherein said service wire termination mechanism within said housing further comprises:
   an actuator mechanism, coupled to said wire carrier member and adapted to move said wire carrier member within said housing and relative to said actuator mechanism, wherein said wire carrier member is provided with means for allowing said electrically insulating medium to flow around said wire carrier member as it is moved within said chamber by said actuator.

14. A terminal block as in claim 11, wherein said chambers are filled with a fluid insulating medium and wherein said service wire termination mechanism further comprises:
   means for actuating movement of said wire carrier member within each of said chambers in a manner such that a substantially constant volume of said fluid insulating medium is maintained within said chamber during such movement.

15. A terminal block as in claim 1, wherein removing said linking module from said access jack severs said conductive connection.

16. A terminal block as in claim 1, wherein said linking module further comprises a bridge contact forming a conductive connection between said service wire junction contact and said exchange wire junction contact.

17. A terminal block as in claim 16, wherein said linking module further comprises a test contact opening and said bridge contact includes an integrally formed test contact extending through said test contact opening for providing signal test access to said bridge contact.

18. A terminal block as in claim 17, said linking module further comprising a protection device and a protector earth contact, said protection device including a first conductive connection to said bridge contact and a second conductive connection to said protector earth contact, wherein said conductive connection is protected by said protection device when said linking module is plugged into said access jack.

19. A terminal block as in claim 16, said linking module further comprising a protection device and a protector earth contact, said protection device including a first conductive connection to said bridge contact and a second conductive connection to said protector earth contact, wherein said conductive connection is protected by said protection device when said linking module is plugged into said access jack.

20. A terminal block as in claim 1, further comprising a stub cable having said plurality of exchange wires therein, wherein the stub cable is permanently secured within said terminal block housing and each exchange wire provided by said stub cable is permanently secured to a respective exchange wire junction contact within said terminal block housing.

21. A terminal block for terminating an exchange wire to a service wire, the terminal block comprising:
   a housing including a plurality of linking module retainers;
   a plurality of access jacks integrally formed with said housing, each said access jack comprising a service wire junction contact, and an exchange wire junction contact;
   a plurality of service wire termination mechanisms on or within said housing, wherein each of said service wire termination mechanisms provides an electrically conductive connection from a service wire to a service wire junction contact;
   a plurality of exchange wires each electrically connected within said housing to a separate exchange wire junction contact; and
   a replaceable linking module removably inserted into one of said access jacks, said linking module including a locking rib,
      wherein said linking module provides a conductive connection between said service wire junction contact and said exchange wire junction contact and, based on a configuration of said linking module, and requiring no change in wiring of said exchange wires and said service wires to said terminal block, selectively to said earth junction contact, and
      further wherein each of said plurality of linking module retainers is adapted to receive said linking module locking rib so as to retain said linking module in said access jack of said terminal block housing, and
      further wherein said locking rib is released from said linking module retainer upon receiving downward pressure and being urged in a direction away from said linking module retainer.

22. A terminal block combination for terminating at least one exchange wire to at least one service wire, the terminal block combination comprising:
   a housing;
   a plurality of access jacks integrally formed with said housing, each said access jack comprising a service wire junction contact, an earth junction contact and an exchange wire junction contact;
   a plurality of service wire termination mechanisms on or within said housing, wherein each of said service wire termination mechanisms is adapted to provide an electrically conductive connection from a service wire to a service wire junction contact;
   a plurality of exchange wires each electrically connected within said housing to a separate exchange wire junction contact; and
   first and second bridge modules, each having a different number of contacts, and adapted to be removably inserted into selected ones of said plurality of access jacks, wherein said bridge modules are adapted to provide a conductive connection between said service wire junction contact and said exchange wire junction contact when inserted into an access jack and wherein said first bridge module is also adapted to provide a conductive connection to said earth junction contact based on a configuration of said first bridge module, and requiring no change in wiring of said exchange wires and said service wires to said terminal block.

23. A terminal block combination as in claim 22, further comprising a linking module adapted to be inserted into a selected access jack, the linking module having a movable conductive contact having a first position and a second position, wherein said linking module provides a conductive connection between said service wire junction contact and said exchange wire junction contact when said contact is in said first position and provides for independent exchange and service wire testing when said contact is in said second position.

24. A terminal block combination as in claim 22, wherein the first bridge module further comprises a surge protection device.

25. A terminal block combination as set out in claim 22, wherein said plurality of access jacks comprise five opening sockets and wherein said first bridge module comprises a five pin connector for engaging said five opening sockets and wherein said second bridge module comprises a four pin connector.

* * * * *